Nov. 28, 1933.    R. P. LANSING ET AL    1,937,235
DRIVING MECHANISM
Filed June 27, 1931    2 Sheets-Sheet 1

INVENTORS
Raymond P. Lansing
Romeo M. Nardone
BY  F. B. Smith
ATTORNEY

Nov. 28, 1933.    R. P. LANSING ET AL    1,937,235
DRIVING MECHANISM
Filed June 27, 1931    2 Sheets-Sheet 2

INVENTORS
Raymond P. Lansing
BY Romeo M. Nardone
F. B. Smith
ATTORNEY

Patented Nov. 28, 1933

1,937,235

UNITED STATES PATENT OFFICE 1,937,235

DRIVING MECHANISM

Raymond P. Lansing, Montclair, and Romeo M. Nardone, Orange, N. J.; said Nardone assignor to Eclipse Aviation Corporation, East Orange, N. J., a corporation of New Jersey Application June 27, 1931. Serial No. 547,358

15 Claims. (Cl. 192—48)

This invention relates to driving mechanisms, and particularly to mechanisms of the type in which the driven member under certain circumstances becomes the driving member, and under other conditions runs faster than (or overruns) the driving member.

More particularly, the invention relates to power transmission mechanism for connecting a driving member to drive a driven member in one direction, for automatically permitting the driven member to run faster than the driving member in the same direction, for controllably causing the driven member to impel the driver when the driven member tends to run faster than the driver in the stated direction and, in some cases, for connecting the driving member to drive the driven member in the opposite, or reverse, direction.

While the mechanism is adapted or adaptable to various uses, it is, as in the embodiment here shown, especially well adapted for use in a motor vehicle transmission system; in this use or embodiment it is in the general class known as "free-wheel" devices, which permit the vehicle to run under momentum, or coast, faster than the effective engine speed.

Considered as a free-wheel device, the principal objects are: to provide a reasonably simple and inexpensive mechanism which may be placed in the transmission line in any of different positions; to effect a positive, forward-driving connection and automatic free-wheeling release without the use of overrunning clutches of ball, roller, or ratchet type, and without frictional power-transmitting devices; to effect or control elimination of the free-wheel action in a simple and positive manner; and to effect backward driving in the same manner or by the same means which "locks out" free-wheeling, with automatic control of the reverse-driving connection by the positioning of a reverse-driving element of the change-gear mechanism, when the invention mechanism is installed between the gear-box and the driving axle.

For these and other purposes, the invention-structure, in preferred embodiments, as here exemplified, includes the following principal features:

A shifter or actuator is mounted for rotary and axial movement on the driving shaft, such movement being effected by a helically-acting connection; this actuator cooperates (by tooth or spline connections) with an arbitrarily shiftable clutch or controlling element connected to turn with the driven shaft, in such manner as to drive the vehicle positively, or automatically to effect free-wheeling when said controlling element is in one position, and to prevent free-wheeling or to drive the vehicle backward when said controlling element is in another position. This controlling element, as above indicated, may be arbitrarily shifted to eliminate free-wheeling; but, when the free-wheel mechanism is at the rear of the gear-box, provision is preferably made to shift it automatically to the same position, for backward driving, by movement of a reversing element of the change-speed gearing; when the mechanism is between the engine (or main clutch) and the gear-box, this item is immaterial. To insure proper movement of the helically-operated actuator, under all conditions, a frictional or spring element may be arranged operatively between it and the shiftable clutch or controlling element.

The characteristics and advantages of the invention are further sufficiently explained in connection with the following detail description of the accompanying drawings, which show a representative embodiment. After considering this example, skilled persons will understand that many variations may be made without departing from the principles disclosed, and we contemplate the employment of any structures or arrangements that are properly within the scope of the appended claims.

Figure 3:
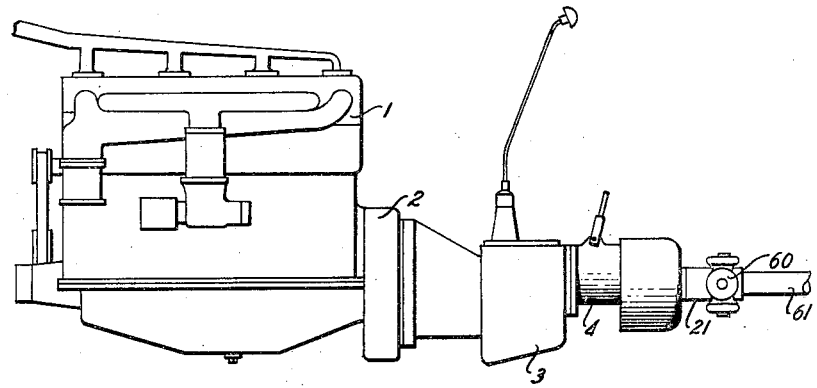
Fig. 3 is a side elevation, largely diagrammatic, of a motor vehicle power plant and "transmission" system, including free-wheel mechanism shown in Figs. 1 and 2.

When the structure of the present invention is embodied in a motor vehicle transmission system, it is associated with an engine 1 (Fig. 3) having a flywheel housing 2 and change speed gearing in a gear box 3, connected at the rear of the flywheel (or clutch) housing. The present free-wheel or power transmission mechanism 4 is arranged in this instance at the rear of the gear box, although it may be located elsewhere, as later referred to.

Figure 1:
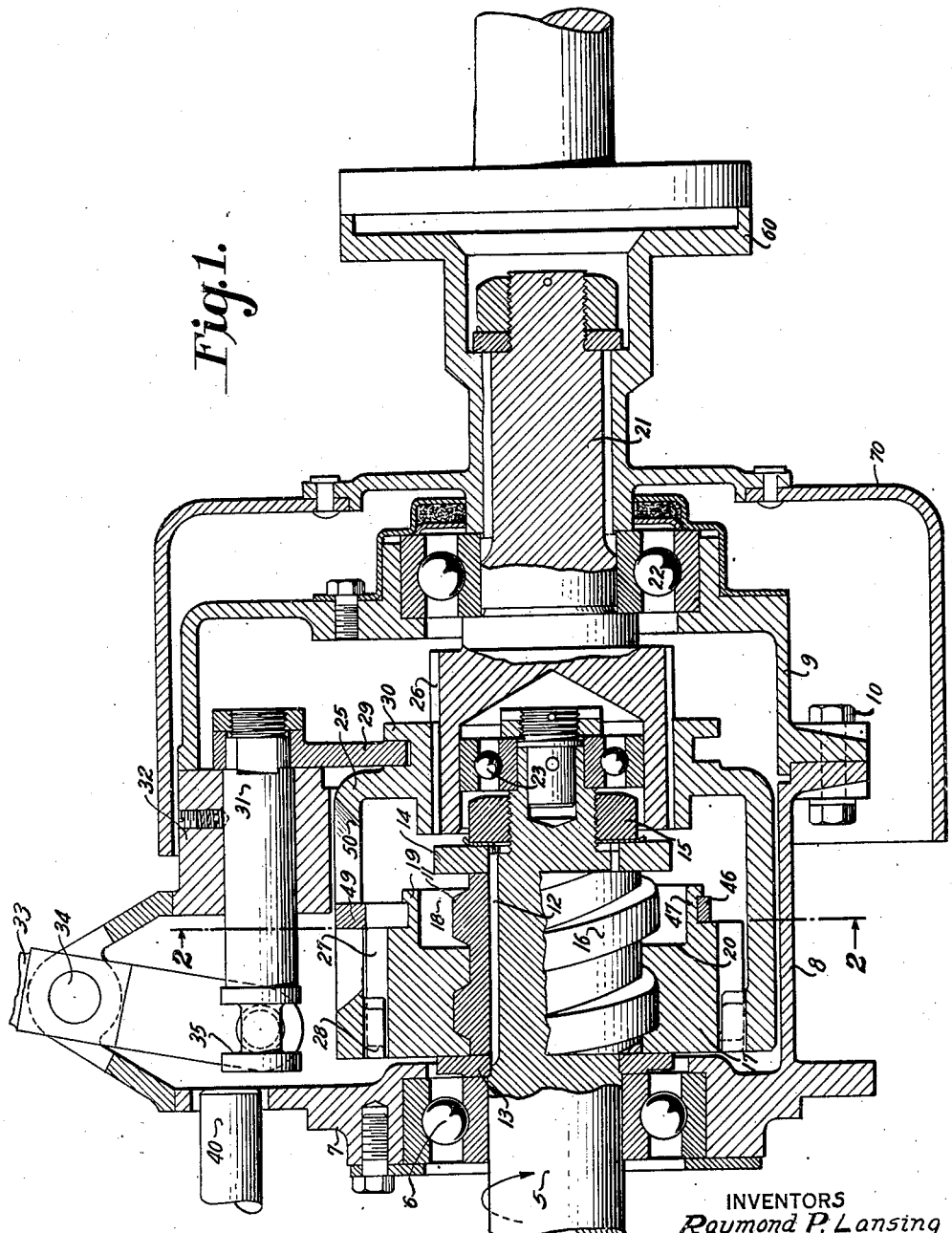
Fig. 1 is a vertical, longitudinal section of a device embodying the invention.

Fig. 1 shows the free wheel mechanism in detail. Its driving shaft 5 is connected to (or may actually be) the rear end portion of the driven shaft of the change speed gearing (commonly called the "transmission"). It is mounted in a bearing 6, supported in a plate 7 which is at the front end of the forward section of the case or housing of the present free wheel mechanism, and may be used in substitution for the usual bearing mounting at the rear end of the gear box. As shown, the plate or bearing mounting 7 has a cylindrical extension 8, to which the rear portion 9 of the casing is connected as by bolts 10.

A screw 11 is fixedly mounted on a rearward portion of shaft 5, by means of key or spline connections 12, between stop rings or plates 13 and 14, and the group consisting of the stop plates and nut is locked against end motion by a nut 15, the forward stop plate 13 being, in the arrangement shown, held against the inner race ring of bearing 6 and a shoulder of shaft 5. The screw 11 has threads 16 of suitable pitch and, in this instance, the pitch angle is shown in Fig. 1 as approximately twenty degrees, and in a direction corresponding to a right hand lead (although the lead or "hand" of the threads may be reversed in some cases, as will appear).

A nut 17, sometimes referred to as a shifter or actuator, is mounted in threaded engagement on the screw, to move rotatably and axially thereon to an extent limited by the stop plates 13 and 14. The rear end of the nut is bored out or chambered as at 18, forming a cylindrical sleeve or flange portion 19 which overlies the stop plate 14 when the nut is in rearward position, and its motion in this direction is limited by engagement of its face 20 with the stop plate. The screw thread connection between the nut and screw 11 represents broadly any suitable helically or angularly acting means for traversing the nut in relation to the driving shaft for the purposes of the invention.

The driven shaft 21 is revolubly mounted in a bearing 22, supported in the rear casing section 9. The rear end of the driving shaft may, if desired, and as shown, have a spigot bearing mounting 23 in the forward end of the driven shaft. A clutch member or drum 25, which may be identified as a controlling member, since it is the primary or immediate controlling means for permitting or eliminating the free wheel action, and for effecting backward driving, is slidably and irrevolvably supported on the driven shaft 21, as by splines 26.

Nut 17 has on its periphery longitudinal teeth or splines 27 of considerable length, and the controlling drum 25 has complemental internal teeth or splines 28, interfitting with and substantially shorter than the splines 27.

The controlling clutch or drum 25 is shifted by a yoke or fork 29, engaging in an annular channel 30 of the drum sleeve and mounted on a rod 31, which reciprocates in a sleeve formation 32 in the front housing part 8. The rod is moved, to position the controlling clutch member, in any convenient way, as by a lever 33, fulcrumed at 34 on the housing section 8 and having a fork or studs engaged in an annular channel 35 at the forward end of the rod.

Provision is also preferably made for automatically moving the controlling or clutch member 25 to locking position (i. e., a position corresponding to the free wheel eliminating position, thus to effect backward driving in a manner which will appear) as an incident to the positioning of an element of the change speed gearing for backward driving. In the present embodiment, this is accomplished by so arranging rod 31 that its forward end is opposed to the rear end of a shifting rod 40, which is moved in a rearward direction to place a gear element in reverse-driving position. In this movement of the reverse shifter 40, it engages rod 31 and moves the latter and the controlling member 25 to reverse driving position.

Figure 2:
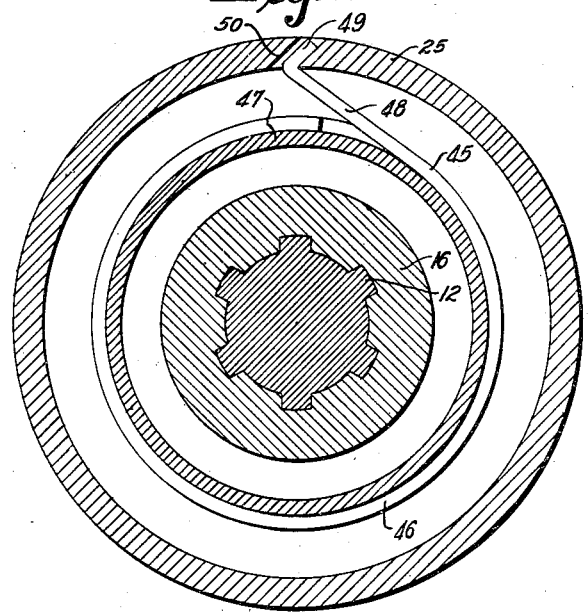
Fig. 2 is a detail section at 2—2, Fig. 1.

To insure proper automatic shifting (axial movement) of nut or actuator 17 by relative rotation of shafts 5 and 21, means may be provided intermediate the nut and clutch member or drum 25, to frictionally retard or cause rotation of the nut in relation to its screw 11 whenever the driving and driven shafts revolve in different directions or at different relative speeds. Such frictional retarding means consists, as here shown, of a wire or strip 45 of suitable spring metal (Figs. 2 and 1) having a coiled or helical portion 46 located in an annular channel 47 of the sleeve 19 of nut 17. A portion 48 of the spring strip extending from the coil 46 has its end 49 bent angularly and located in a longitudinal slot 50 in drum 25. The spring is thus connected to rotate with the drum, and free to move longitudinally in relation to the drum as the nut moves longitudinally. The coil portion 46 is so designed as to exert moderate constrictive, or axially directed, frictional pressure against the inner or end walls of the channel 47, and thus the nut is frictionally urged to rotate on its screw, to produce axial traverse of the nut by cooperation of the screw and nut threads.

The driven shaft 21 is connected to drive the driving wheels of the vehicle in any usual way, as by a universal joint 60, Fig. 1 and Cardan shaft 61 leading to the axle.

A brake drum 70 is sometimes secured in shaft 21, and is here shown as graphically indicating the lengthwise compactness of the free wheeling mechanism, which is largely enclosed within this brake drum and is but slightly longer than the face width of the drum.

In standard motor vehicle practice, shaft 5, which in the present instance is connected to or is actually the rear portion of the driven shaft of the change speed gearing, always rotates clockwise as viewed from the front of the vehicle (or from the left of Fig. 1) as indicated by the arrow, when the gear combinations are set for any forward driving ratio. In agreement with this direction of rotation of the driving shaft and other features of design in the present embodiment, the threads 16 have a right hand lead, as above stated.

For forward driving, with automatic free wheeling, the control or clutch member 25 is placed, by movement of the lever 33 or other controlling means, in its forward position, as shown in Fig. 1. In starting the vehicle, or whenever during forward driving there is a load resistance applied to the driven shaft 21, shaft 5 turns in the clockwise direction while shaft 21 is stationary, or tends to turn slower in the same direction. Rotation of nut 17, if it is at the time in any rearward position, is retarded (in relation to screw 11) by the frictional drag of the retarding spring 46. The screw thus acts to move the nut axially forward until it abuts against stop plate 13, and in this position (in which it is shown in Fig. 1), the forward portions of its splines 27 are engaged with the splines 28 of the controlling or clutch member 25. Nut 17, being held against the forward stop plate by action of the screw, is positively driven and drives the clutch member 25, and the driven shaft, in the forward direction. Whenever the driven shaft tends to run in the stated forward or clockwise direction faster than the driving shaft (the controlling or clutch member 25 being retained in the forward position as shown in Fig. 1), clutch member 25 through its splines 28 rotates the nut 17 in a forward or right-hand direction in relation to the driving shaft and screw 11, and the screw threads act to move the nut axially rearward until its splines are free from the rearward ends of splines 28 of the controlling or clutch member 25, this movement of the nut being then checked by engagement of its face 20 with the rear stop plate 14. The controlling or clutch member 25 is thus disconnected from the nut and from the driving shaft, and the driven shaft is free to turn in the forward or right hand direction, permitting the car to run or coast freely under momentum or the force of gravity so long as the engine speed (with due regard to the gear combination at the time in operation) is slower than the rotary speed of shaft 21.

Whenever the engine speed, effective through the driving shaft 5, exceeds the speed of shaft 21, screw 11 again acts to move nut 17 forward and reestablish the forward driving connection.

To eliminate the free wheeling action during forward driving, for the purpose, for example, of utilizing the engine as a braking force, the controlling lever 33 is moved to shift the controlling or clutch member 25 to its rearward position. In this position its teeth or splines 28 remain in engagement with the splines 27 of nut 17, while the nut is in its forward position as shown, and also in any intermediate position and in the rearward position of the nut. If the engine tends to drive the driven shaft, the nut is held in forward position with positive driving effect as previously. If the driven shaft 21 tends to run faster than the driving shaft, it may turn in the forward or right-hand direction in relation to the driving shaft sufficiently to traverse the nut along the screw to its rearmost position wherein the nut is checked by its face 20 engaging with stop plate 14, and the driven shaft will then tend to positively drive the driving shaft and the engine through clutch member 25, the nut, stop plate 14, and the screw 11, so long as the car tends to run faster than the effective engine speed.

When the free wheel mechanism is located in the rear of the gear box, as here shown and as above referred to, in backward driving the driving shaft 5 rotates in the opposite direction to that indicated and referred to above; that is, in the counter-clockwise direction, producing the same relative movement, or tendency to the same relative rotation, of the driving and driven shafts as exists when the driven shaft tends to run faster than the driving shaft during forward movement of the vehicle. For backward driving, therefore, the clutch or controlling member 25 is placed in rearmost position, thus in effect locking the driving shaft to the driven shaft and providing positive backward propulsion of the car, the action being the same as that resulting from "locking out" free wheeling, in forward driving. It is for this purpose also that in preferred embodiments, as above referred to, the controlling clutch member 25 is automatically positioned in stated locking position as an incident to the movement of a gear element in the gear box to "reverse" position.

As also stated, the free wheel mechanism may, if desired, be placed between the engine and the gear-box or between the main driving clutch and the gear box, and, in that case, the driving shaft 5 will be connected to the engine crank shaft or to the driven clutch shaft (or may be actually the driven clutch shaft) and will always revolve in a clockwise direction (as viewed from the front of the car) during forward or backward driving; and special provision or precaution to effect backward driving through the present power transmission or free wheel mechanism, is superfluous and may be omitted.

While shaft 5 is here arranged and referred to as the driving member, and shaft 21 as the driven member, the shaft arrangements or functions are, in any broad sense, interchangeable, since evidently in some cases the shaft carrying the screw and actuator 17 may be the driven member, and the shaft carrying the connecting or controlling member 25 may be the driving member.

What is claimed is:

1. Power transmission mechanism comprising a driving member, a driven member, an actuator having helical cooperation with one member, a shiftable controller connected to rotate with the other member, and slidably cooperating connecting means intermediate the actuator and controller and effective to lock the driving member to the driven member in one direction and to permit free, relatively faster rotation of the driven member in the same direction, said slidably cooperating connecting means being of sufficient extent axially to insure maintenance of the locked condition over a considerable range of axial movement of said actuator.

2. Power transmission mechanism comprising a driving member, a driven member, an actuator having helical cooperation with one member, a shiftable controller connected to rotate with the other member, and slidably cooperating connecting means intermediate the actuator and controller and effective to positively connect the driving member to drive the driven member in one direction and to permit free, relatively faster rotation of the driven member in the same direction, and also effective with the controller in any one of a plurality of positions located within a predetermined range axially along said actuator to positively connect the driving and driven members in the opposite relative direction of rotation.

3. Power transmission mechanism comprising a driving member, a driven member, an actuator having helical cooperation with the driving member, a shiftable controlling member connected to rotate with the driven member, and slidably cooperating connecting means intermediate the actuator and controlling member effective to connect the driving member to positively drive the driven member in one direction and to permit automatically, free, relatively faster rotation of the driven member in the same direction, said slidably cooperating connecting means being of sufficient extent axially to insure maintenance of the locked condition over a considerable range of axial movement of said actuator.

4. Power transmission mechanism comprising a driving member, a driven member, an actuator having helical cooperation with the driving member, a shiftable controlling member connected to rotate with the driven member, and slidably cooperating connecting means intermediate the actuator and controlling member effective to connect the driving member to positively drive the driven member in one direction and to permit automatically, free, relatively faster rotation of the driven member in the same direction and also effective with the controlling member in any one of a plurality of positions located within a predetermined range axially along said actuator to positively connect the driven and driving members in the opposite relative direction of rotation.

5. Power transmission mechanism comprising a driving shaft, a driven shaft, an actuator having shiftable helical connection with one shaft, a connecting and controlling member shiftable on and connected to rotate with the other shaft, and positive relatively slidable means to lock the actuator with the controlling member when they are in any one of a plurality of certain positions and to disconnect them in other relative positions.

6. Power transmission mechanism comprising a driving shaft, a driven shaft, an actuator having shiftable helical connection with one shaft, a connecting and controlling member shiftable on and connected to rotate with the other shaft, and positive relatively slidable means to connect the actuator with the controlling member when they are in certain positions and to disconnect them in other relative positions, and frictional drag means operatively between the actuator and the connecting and controlling member.

7. Power transmission mechanism comprising a driving shaft, a driven shaft, an actuator having shiftable screw connection with the driving shaft, a connecting and controlling member shiftable on and connected to rotate with the driven shaft, and positive relatively slidable means to lock the actuator with the controlling member in any one of a plurality of certain positions and to disconnect them in other relative positions.

8. Power transmission mechanism comprising a driving shaft, a driven shaft, an actuator having shiftable screw connection with the driving shaft, a connecting and controlling member shiftable on and connected to rotate with the driven shaft, and positive relatively slidable means to connect the actuator with the controlling member in certain of their positions and to disconnect them in other relative positions, and frictional drag means operatively between the actuator and the driven shaft.

9. Power transmission mechanism comprising a driving shaft, a driven shaft, an actuator having shiftable helical connection with one shaft, a connecting and controlling member shiftable on and connected to rotate with the other shaft, and positive relatively slidable means to lock the actuator with the controlling member when they are in any one of a plurality of certain positions and to disconnect them in other relative positions, and stops limiting shifting movement of the actuator.

10. Power transmission mechanism comprising a driving shaft, a driven shaft, an actuator having shiftable screw connection with the driving shaft, a connecting and controlling member shiftable on and connected to rotate with the driven shaft, and positive relatively slidable means to lock the actuator with the controlling member in any one of a plurality of certain positions and to disconnect them in other relative positions, and stops on the driving shaft limiting shifting movement of the actuator.

11. Power transmission mechanism comprising a driving shaft, a driven shaft, a screw on the driving shaft, a nut revolvable on the screw, a controlling and connecting member slidably splined on the driven shaft, and cooperating slidably engageable members on the nut and connecting member arranged to have interlocking engagement in any one of a plurality of certain positions and to be disengaged in another relative position.

12. Power transmission mechanism comprising a driving shaft, a driven shaft, a screw on the driving shaft, a nut revolvable on the screw, a controlling and connecting member slidably splined on the driven shaft, and cooperating slidably engageable members on the nut and connecting member arranged to have interlocking engagement in a certain relative position and to be disengaged in another relative position, and a frictional retarding element acting on the nut and connected with the connecting and controlling member.

13. Power transmission mechanism comprising a driving shaft, a driven shaft, a pitch screw on the driving shaft, a nut revolvable on the screw, means limiting axial travel of the nut, a controlling and connecting member slidably splined on the driven shaft, and cooperating formations on the nut and connecting member arranged to have interlocking engagement in any one of a plurality of predetermined positions and to be disengaged in another relative position.

14. Power transmission mechanism comprising a driving shaft, a driven shaft, a pitch screw on the driving shaft, a nut revolvable on the screw, means limiting axial travel of the nut, a controlling and connecting member slidably splined on the driven shaft, and cooperating formations on the nut and connecting member arranged to have interlocking engagement in a certain relative position and to be disengaged in another relative position, and a frictional retarding element acting on the nut and having slidable connection with the connecting and controlling member.

15. In a motor vehicle, in combination with the engine, power transmission mechanism comprising a driving member, a driven member, an actuator having helical cooperation with one member, a shiftable controller connected to rotate with the other member, and slidably cooperating connecting means intermediate the actuator and controller and effective to connect the driving member to drive the driven member in one direction and to permit free, relatively faster rotation of the driven member in the same direction, said slidably cooperating connecting means being of sufficient extent axially to insure maintenance of the locked condition over a considerable range of axial movement of said actuator.

RAYMOND P. LANSING.
ROMEO M. NARDONE.